(12) United States Patent
Lin et al.

(10) Patent No.: US 10,908,879 B2
(45) Date of Patent: Feb. 2, 2021

(54) FAST VECTOR MULTIPLICATION AND ACCUMULATION CIRCUIT

(71) Applicant: NEUCHIPS CORPORATION, Hsinchu (TW)

(72) Inventors: Youn-Long Lin, Hsinchu (TW); Tao-Yi Lee, Taichung (TW)

(73) Assignee: NEUCHIPS CORPORATION, Hsinchu (TW)

( * ) Notice: Subject to any disclaimer, the term of this patent is extended or adjusted under 35 U.S.C. 154(b) by 210 days.

(21) Appl. No.: 16/190,129

(22) Filed: Nov. 13, 2018

(65) Prior Publication Data

US 2019/0272150 A1 Sep. 5, 2019

Related U.S. Application Data

(60) Provisional application No. 62/637,399, filed on Mar. 2, 2018.

(30) Foreign Application Priority Data

May 1, 2018 (TW) .............................. 107114790 A

(51) Int. Cl.
| | |
|---|---|
| *G06F 7/544* | (2006.01) |
| *G06F 17/16* | (2006.01) |
| *G06N 3/08* | (2006.01) |
| *G06F 7/53* | (2006.01) |
| *G06F 17/17* | (2006.01) |

(52) U.S. Cl.
CPC .......... *G06F 7/5443* (2013.01); *G06F 7/5312* (2013.01); *G06F 17/16* (2013.01); *G06F 17/17* (2013.01); *G06N 3/08* (2013.01)

(58) Field of Classification Search
CPC ...... G06F 7/523; G06F 7/5275; G06F 7/5312; G06F 7/5443; G06F 7/74; G06F 5/01;
(Continued)

(56) References Cited

U.S. PATENT DOCUMENTS 3,752,971 A 8/1973 Calhoun et al.
5,204,830 A 4/1993 Wang et al.
(Continued)

FOREIGN PATENT DOCUMENTS

CN 1278341 A 12/2000

OTHER PUBLICATIONS

SK Lee et al., Multiplierless Reconfigurable processing Element and its Applications to DSP Kernels, IEEE 2005 (Year: 2005).*
(Continued)

*Primary Examiner* — Andrew Caldwell
*Assistant Examiner* — Emily E Larocque
(74) *Attorney, Agent, or Firm* — CKC & Partners Co., LLC

(57) ABSTRACT

A fast vector multiplication and accumulation circuit is applied to an artificial neural network accelerator and configured to calculate an inner product of a multiplier vector and a multiplicand vector. A scheduler is configured to arrange a plurality of multiplicands of the multiplicand vector into a plurality of scheduled operands according to a plurality of multipliers of the multiplier vector, respectively. A self-accumulating adder is signally connected to the scheduler and includes a compressor, at least two delay elements and at least one shifter. The compressor is configured to add the scheduled operands to generate a plurality of compressed operands. The at least two delay elements are connected to the compressor. The shifter is configured to shift one of the compressed operands. An adder is signally connected to the output ports of the compressor so as to add the compressed operands to generate the inner product.

19 Claims, 15 Drawing Sheets

(58) Field of Classification Search
CPC ........ G06F 17/15; G06F 17/153; G06F 17/16; G06F 17/17; G06N 3/00; G06N 3/04; G06N 3/06; G06N 3/063
See application file for complete search history.

(56) References Cited

U.S. PATENT DOCUMENTS

| | | |
|---|---|---|
| 5,799,134 A | 8/1998 | Chiueh et al. |
| 6,081,225 A | 6/2000 | Tsai et al. |
| 8,959,137 B1 | 2/2015 | Langhammer |
| 9,153,230 B2 | 10/2015 | Maaninen |
| 9,384,168 B2 | 7/2016 | Mortensen |
| 9,697,463 B2 | 7/2017 | Ross et al. |
| 9,710,265 B1 | 7/2017 | Temam et al. |
| 2005/0004963 A1* | 1/2005 | Guo ................... G06F 17/147 708/402 |
| 2009/0063608 A1 | 3/2009 | Mejdrich et al. |
| 2013/0166616 A1* | 6/2013 | Fasthuber ............. G06F 9/3001 708/620 |

OTHER PUBLICATIONS

MS Kim et al., Low-power Implementation of Mitchell's Approximate Logarithmic Multiplication for Convolutional Neural Networks, IEEE Feb. 22, 2018 (Year: 2018).*

Merriam Webster Dictonary online https://www.merriam-webster.com/dictionary/represent, 2020 (Year: 2020).*

* cited by examiner

| Time | | | | | | | → | |
|---|---|---|---|---|---|---|---|---|
| Cycle | 1 | 2 | 3 | ...(n cycles) | n+4 | n+5 | n+6 |
| State | LOAD | PROC | PROC | PROC | PROC | LOAD | PROC |
| $M_c$ | $LC_0^{(0)}$ | $LC_0^{(1)}$ | $LC_0^{(2)}$ | ... | $LC_0^{(n+3)}$ | $LC_1^{(0)}$ | $LC_1^{(1)}$ |
| $M_r$ | $LT_0^{(0)}$ | $LT_0^{(1)}$ | $LT_0^{(2)}$ | ... | $LT_0^{(n+3)}$ | $LT_1^{(0)}$ | $LT_1^{(1)}$ |
| $EP_0$-$EP_7$ | NOP | $CE_0^{(1)}$ | $CE_0^{(2)}$ | ... | $CE_0^{(n+3)}$ | CX | $CE_1^{(1)}$ |
| $y_0$-$y_7$ (220a) | NOP | $CT_0^{(1)}$ | $CT_0^{(2)}$ | ... | $CT_0^{(n+3)}$ | NOP | $CT_1^{(1)}$ |
| $y_0$-$y_7$ (220b) | NOP | $CC_0^{(1)}$ | $CC_0^{(2)}$ | ... | $CC_0^{(n+3)}$ | NOP | $CC_1^{(1)}$ |
| $M_s$ | NOP | $WC_0^{(1)}$ | $WC_0^{(2)}$ | ... | $WC_0^{(n+3)}$ | NOP | $WC_1^{(1)}$ |

Fig. 3D

| Time | | | | | | | |
|---|---|---|---|---|---|---|---|
| Cycle | 1 | 2 | 3 | ...(n cycles) | n+4 | n+5 | n+6 |
| Input registers | $Lx_1^{(0)}$ | $Lx_1^{(1)}$ | $Lx_1^{(2)}$ | ... | $Lx_1^{(n+3)}$ | $Lx_2^{(0)}$ | $Lx_2^{(1)}$ |
| Full adder S $C_{out}$ | NOP NOP | $C\sigma_1^{(0)}$ $C\gamma_1^{(0)}$ | $C\sigma_1^{(1)}$ $C\gamma_1^{(1)}$ | ... ... | $C\sigma_1^{(n+2)}$ $C\gamma_1^{(n+2)}$ | $C\sigma_1^{(n+3)}$ $C\gamma_1^{(n+3)}$ | $C\sigma_2^{(0)}$ $C\gamma_2^{(0)}$ |
| Output FIFO | NOP | NOP | NOP | NOP | NOP | $W\sigma_1^{(0)}, W\gamma_1^{(0)}$ | NOP |

Fig. 4B

| Time | | | | | | | →  |
|---|---|---|---|---|---|---|---|
| Cycle | 1 | 2 | 3 | ...(n cycles) | n+4 | n+5 | n+6 |
| State | LOAD | PROC | PROC | PROC | PROC | LOAD | PROC |
| 410a | | | | | | | |
| 410a ($p_i[15:0]$) | $Lx_0$ | NOP | NOP | ... | NOP | $Lx_1$ | NOP |
| 410a ($s_o$) | $Wx[0]_0$ | $Wx[1]_0$ | $Wx[2]_0$ | ... | $Wx[n+3]_0$ | $Wx[0]_1$ | $Wx[1]_1$ |
| 410b | | | | | | | |
| 410b ($p_i[15:0]$) | $Ly_0$ | NOP | NOP | ... | NOP | $Ly_1$ | NOP |
| 410b ($s_o$) | $Wy[0]_0$ | $Wy[1]_0$ | $Wy[2]_0$ | ... | $Wy[n+3]_0$ | $Wy[0]_1$ | $Wy[1]_1$ |
| 420 | $CZ[0]_0$ | $CZ[1]_0$ | $CZ[2]_0$ | ... | $CZ[n+3]_0$ | $CZ[0]_1$ | $CZ[1]_1$ |
| 440/450 | $CEP_0$ | NOP | NOP | ... | NOP | $CEP_1$ | NOP |
| 430 | NOP | $WZ[0]_0$ | $WZ[1]_0$ | ... | $WZ[n+2]_0$ | $WZ[n+3]_0$ | $WZ[0]_1$ |
| 430 ($Z[MSB:1]$ RST) | NOP | RST | NOP | ... | NOP | NOP | RST |
| 430 ($Z[MSB:n_1+1]$ RST) | NOP | NOP | NOP | ... | NOP | RST | NOP |

Fig. 7

FAST VECTOR MULTIPLICATION AND ACCUMULATION CIRCUIT

RELATED APPLICATIONS

This application claims priority to U.S. Provisional Application Ser. No. 62/637,399, filed Mar. 2, 2018, and Taiwan Application Serial Number 107114790, filed May 1, 2018, the disclosures of which are incorporated herein by reference in their entireties.

BACKGROUND

Technical Field

The present disclosure relates to a fast vector multiplication and accumulation circuit. More particularly, the present disclosure relates to a fast vector multiplication and accumulation circuit applied to an artificial neural network accelerator.

Description of Related Art

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

Some conventional systems perform computations for a given convolutional layer in software. For example, the software can apply each kernel for the layer to the set of activation inputs. That is, for each kernel, the software can overlay the kernel, which can be represented multi-dimensionally, over a first portion of activation inputs, which can be represented multi-dimensionally. The software can then compute an inner product from the overlapped elements. The inner product can correspond to a single activation input, e.g., an activation input element that has an upper-left position in the overlapped multi-dimensional space. For example, using a sliding window, the software then can shift the kernel to overlay a second portion of activation inputs and calculate another inner product corresponding to another activation input. The software can repeatedly perform this process until each activation input has a corresponding inner product. In some implementations, the inner products are input to an activation function, which generates activation values. The activation values can be combined, e.g., pooling, before being sent to a subsequent layer of the neural network.

One way of computing convolution calculations requires activation tensors and core tensors in a large dimensional space. A processor can compute matrix multiplications via a direct multiplier. For example, although compute-intensive and time-intensive, the processor can repeatedly calculate individual sums and products for convolution calculations. The degree to which the processor parallelizes calculations is limited due to its architecture, and the computational complexity and power consumption are greatly increased.

Accordingly, a fast vector multiplication and accumulation circuit being capable of greatly enhancing a level of vector parallelism of a long vector inner product operation and reducing power consumption is commercially desirable.

SUMMARY

According to one aspect of the present disclosure, a fast vector multiplication and accumulation circuit is applied to an artificial neural network accelerator and configured to calculate an inner product of a multiplier vector and a multiplicand vector. The fast vector multiplication and accumulation circuit includes a scheduler, a self-accumulating adder and an adder. The scheduler is configured to arrange a plurality of multiplicands of the multiplicand vector into a plurality of scheduled operands according to a plurality of multipliers of the multiplier vector, respectively. The self-accumulating adder is signally connected to the scheduler and includes a compressor, at least two delay elements and at least one shifter. The compressor has a plurality of input ports and a plurality of output ports. One of the input ports sequentially receives the scheduled operands. The compressor is configured to add the scheduled operands to generate a plurality of compressed operands, and the compressed operands are transmitted via the output ports. The at least two delay elements are connected to other two of the input ports of the compressor, respectively. One of the at least two delay elements is connected to one of the output ports. The shifter is connected between another one of the output ports and the other one of the at least two delay elements. The shifter is configured to shift one of the compressed operands. The adder is signally connected to the output ports of the compressor so as to add the compressed operands to generate the inner product.

BRIEF DESCRIPTION OF THE DRAWINGS

The present disclosure can be more fully understood by reading the following detailed description of the embodiment, with reference made to the accompanying drawings as follows:

FIG. 3D shows pipeline timing diagrams of the scheduler of FIG. 3A.

FIG. 4B shows pipeline timing diagrams of the self-accumulating adder of FIG. 4A.

FIG. 7 shows pipeline timing diagrams of the adder of FIG. 6.

DETAILED DESCRIPTION

Figure 1:
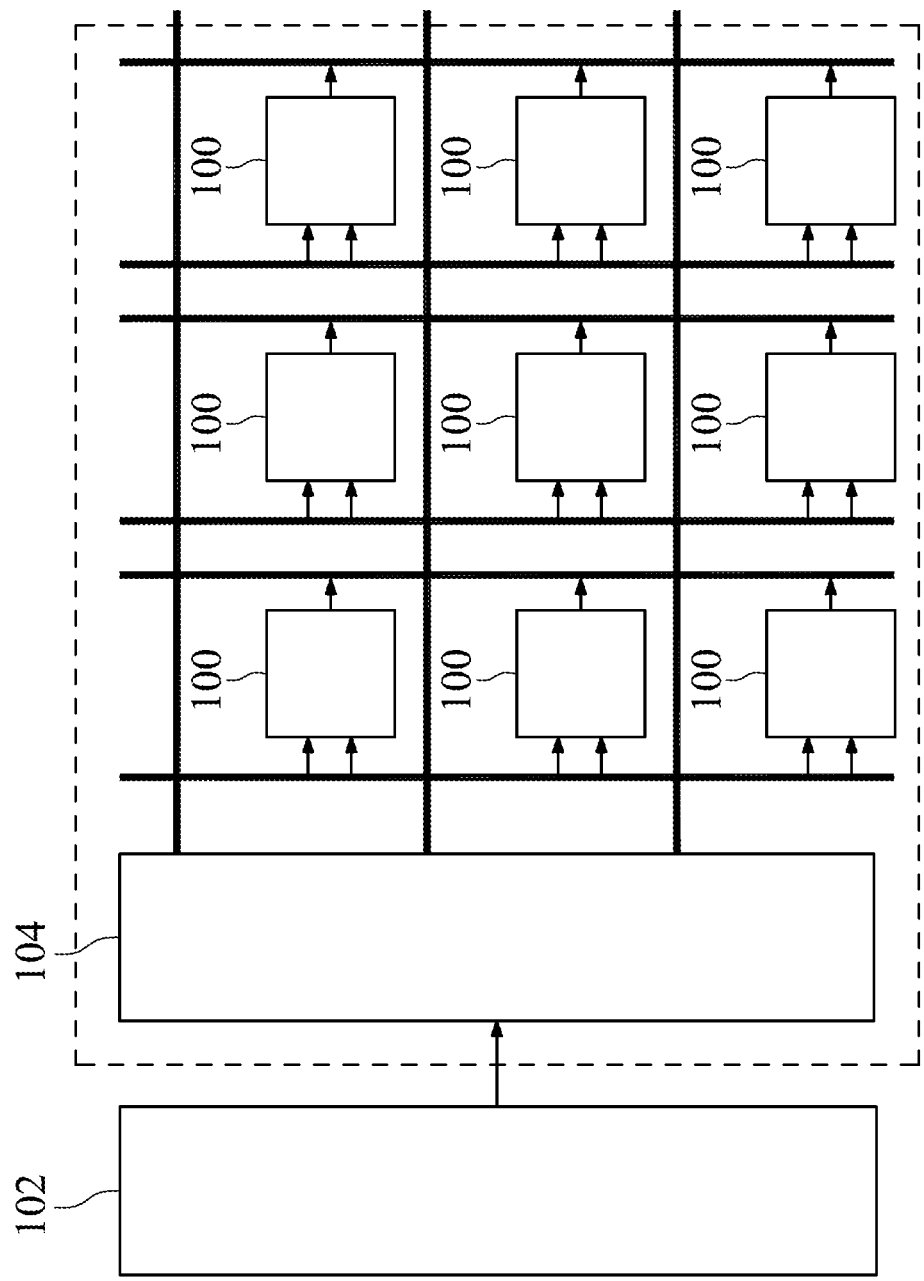
FIG. 1 shows a circuit block diagram of an artificial neural network accelerator according to one embodiment of the present disclosure.
Figure 2:
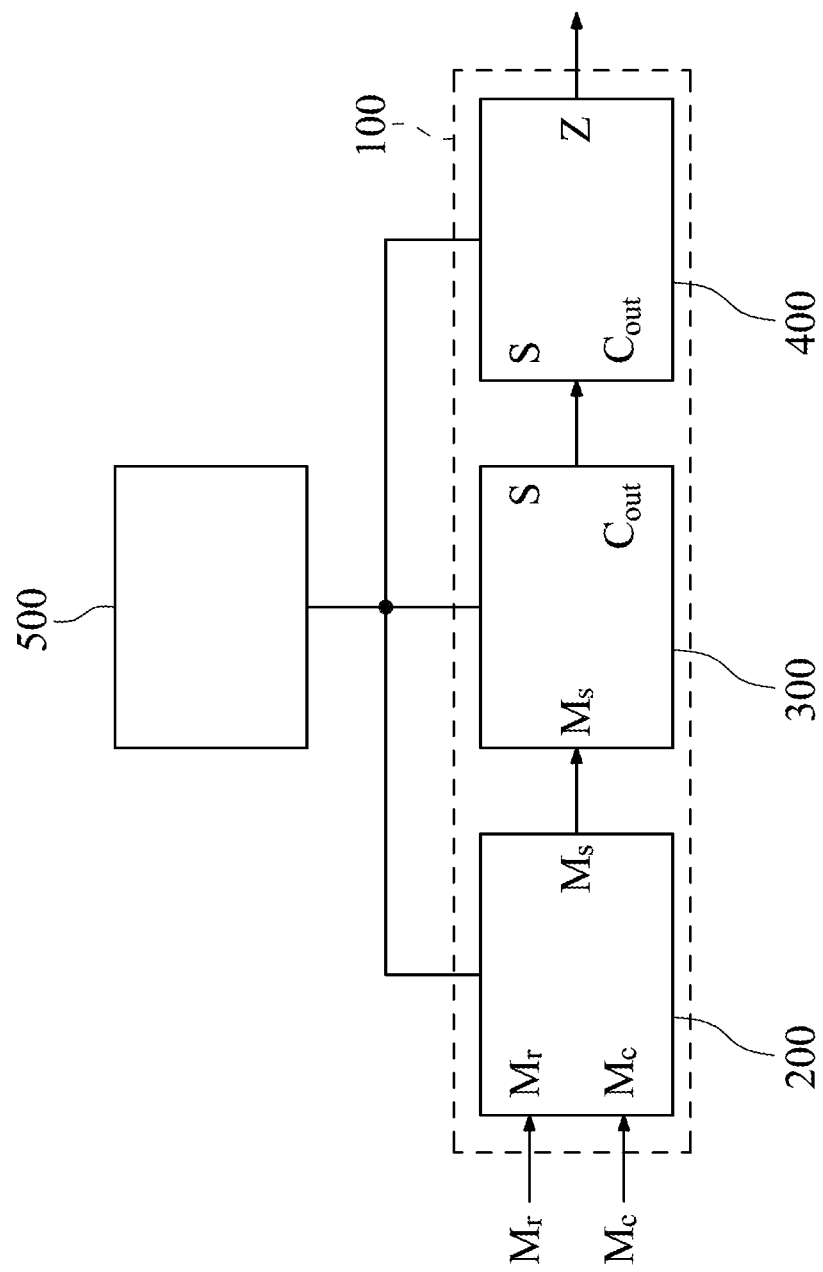
FIG. 2 shows a circuit block diagram of a fast vector multiplication and accumulation circuit according to one example of FIG. 1.

FIG. 1 shows a circuit block diagram of an artificial neural network accelerator 110 according to one embodiment of the present disclosure. FIG. 2 shows a circuit block diagram of a fast vector multiplication and accumulation circuit 100 according to one example of FIG. 1. The artificial neural network accelerator 110 includes a dynamic random access memory 102 (DRAM), a global buffer 104 (GLB), a plurality of fast vector multiplication and accumulation circuits 100 and a control processor 500. The fast vector multiplication and accumulation circuit 100 is applied to the artificial neural network accelerator 110 and configured to calculate an inner product Z of a multiplier vector $M_r$ and a multiplicand vector $M_c$. The fast vector multiplication and accumulation circuit 100 includes a scheduler 200, a self-accumulating adder 300 and an adder 400.

The scheduler 200 is configured to arrange a plurality of multiplicands of the multiplicand vector $M_c$ into a plurality of scheduled operands $M_s$ according to a plurality of multipliers of the multiplier vector $M_r$, respectively. For example, equation (1) represents an inner product computation of the multiplier vector $M_r$ and the multiplicand vector $M_c$. Table 1 lists the results of the inner product computation of equation (1) accomplished by the fast vector multiplication and accumulation circuit 100 of FIG. 2.

$$(M_c, M_r) = \left(\begin{bmatrix} 10 \\ 15 \\ 3 \end{bmatrix}, \begin{bmatrix} 7 \\ 4 \\ 9 \end{bmatrix}\right) = \qquad (1)$$

$$\left(\begin{bmatrix} 00001010_2 \\ 00001111_2 \\ 00000011_2 \end{bmatrix}, \begin{bmatrix} 00000111_2 \\ 00000100_2 \\ 00001001_2 \end{bmatrix}\right) = 10 \times 7 + 15 \times 4 + 3 \times 9 = 157$$

TABLE 1

| | |
|---|---|
| $M_c[0]$ | 00001010 (Ms) |
| $M_c[0]$ (<<1) | 00010100 (Ms) |
| $M_c[0]$ (<<2) | 00101000 (Ms) |
| S[0] | 00110110 |
| $C_{out}[0]$ | 000010000 |
| $M_c[1]$ (<<2) | 00111100 (Ms) |
| S[1] | 00011010 |
| $C_{out}[1]$ | 00110100 |
| $M_c[2]$ | 00000011 (Ms) |
| S[2] | 01110001 |
| $C_{out}[2]$ | 00010100 |
| $M_c[2]$ (<<3) | 00011000 (Ms) |

TABLE 1-continued

| | |
|---|---|
| S[3] | 01111101 |
| $C_{out}[3]$ | 00100000 |
| | 10011101 = $157_{dec}$ = Z |

In equation (1) and Table 1, it is assumed that the multiplicand vector $M_c$ includes three multiplicands $M_c[0]$, $M_c[1]$ and $M_c[2]$. The decimal representations of the three multiplicands $M_c[0]$, $M_c[1]$ and $M_c[2]$ are 10, 15 and 3, respectively. The binary representations of the three multiplicands $M_c[0]$, $M_c[1]$ and $M_c[2]$ are "00001010", "00001111" and "00000011", respectively. The multiplier vector $M_r$ includes three multipliers. The decimal representations of the three multipliers are 7, 4 and 9, respectively. The binary representations of the three multipliers are "00000111", "00000100" and "00001001", respectively. When a first multiplicand $M_c[0]$ (i.e., $10_{dec}$ and $00001010_{bin}$) is multiplied by a first multiplier (i.e., $7_{dec}$ and $00000111_{bin}$), the scheduler 200 arranges the first multiplicand $M_c[0]$ into three scheduled operands $M_s$ according to three "1" of the first multiplier ($00000111_{bin}$). The three scheduled operands $M_s$ are "00001010", "00010100" and "00101000", respectively. The first one of the three scheduled operands $M_s$ is equal to the first multiplicand $M_c[0]$. The first multiplicand $M_c[0]$ is left shifted by one bit to form the second one of the three scheduled operands $M_s$. The first multiplicand $M_c[0]$ is left shifted by two bits to form the third one of the three scheduled operands $M_s$, as shown in lines 1-3 of Table 1. Moreover, when a second multiplicand $M_c[1]$ (i.e., $15_{dec}$ and $00001111_{bin}$) is multiplied by a second multiplier (i.e., $4_{dec}$ and $00000100_{bin}$), the scheduler 200 arranges the second multiplicand $M_c[1]$ into one scheduled operand $M_s$ according to one "1" of the second multiplier ($00000100_{bin}$). The scheduled operand $M_s$ is "00111100". In other words, the second multiplicand $M_c[1]$ is left shifted by two bits to form the scheduled operand $M_s$, as shown in line 6 of Table 1. In addition, when a third multiplicand $M_c[2]$ (i.e., $3_{dec}$ and $00000011_{bin}$) is multiplied by a third multiplier (i.e., $9_{dec}$ and $00001001_{bin}$), the scheduler 200 arranges the third multiplicand $M_c[2]$ into two scheduled operands $M_s$ according to two "1" of the third multiplier ($00001001_{bin}$). The two scheduled operands $M_s$ are "00000011" and "00011000", respectively. The first one of the two scheduled operands $M_s$ is equal to the third multiplicand $M_c[2]$. The third multiplicand $M_c[2]$ is left shifted by three bits to form the second one of the two scheduled operands $M_s$, as shown in lines 9 and 12 of Table 1.

The self-accumulating adder 300 is signally connected to the scheduler 200. The self-accumulating adder 300 is configured to add the scheduled operands $M_s$ to generate a plurality of compressed operands S[n], $C_{out}[n]$, wherein n is an integer greater than or equal to 0. For example, the self-accumulating adder 300 sequentially performs four addition operations which includes a first addition operation, a second addition operation, a third addition operation and a fourth addition operation, as shown in equation (1) and Table 1. The first addition operation represents that the self-accumulating adder 300 adds three scheduled operands $M_s$ (i.e., $M_c[0]$=00001010, $M_c[0]$(<<1)=00010100 and $M_c[0]$(<<2)=00101000) to generate two compressed operands S[0], $C_{out}[0]$, as shown in lines 4 and 5 of Table 1. The second addition operation represents that the self-accumulating adder 300 adds the two compressed operands S[0], $C_{out}[0]$ and a scheduled operand $M_s$ (i.e., $M_c[1]$(<<2)= 00111100) to generate two compressed operands S[1], $C_{out}[1]$, as shown in lines 7 and 8 of Table 1. The third addition operation represents that the self-accumulating adder 300 adds the two compressed operands S[1], $C_{out}$[1] and a scheduled operand $M_s$ (i.e., $M_c$[2]=00000011) to generate two compressed operands S[2], $C_{out}$[2], as shown in lines 10 and 11 of Table 1. The fourth addition operation represents that the self-accumulating adder 300 adds the two compressed operands S[2], $C_{out}$[2] and a scheduled operand $M_s$ (i.e., $M_c$[2](<<2)=00011000) to generate two compressed operands S[3], $C_{out}$[3], as shown in lines 13 and 14 of Table 1.

The adder 400 is signally connected to the output ports S, $C_{out}$ of the compressor 300 so as to add the two compressed operands S[3], $C_{out}$[3] to generate the inner product Z, as shown in line 15 of Table 1. The adder 400 is implemented as a carry look-ahead adder, a carry propagate adder, a carry save adder or a ripple carry adder.

In addition, a controlling processor 500 is disposed in the artificial neural network accelerator 110 and signally connected to the scheduler 200, the self-accumulating adder 300 and the adder 400. The controlling processor 500 is configured to control the scheduler 200, the self-accumulating adder 300 and the adder 400. The controlling processor 500 may be a central processing unit (CPU), a micro-control unit (MCU), or other control logic circuits. The artificial neural network accelerator 110 includes a plurality of layer processing modules (not shown). The controlling processor 500 is signally connected to the layer processing modules. The controlling processor 500 detects the layer processing modules. The controlling processor 500 generates a plurality of controlling signals and transmits the controlling signals to the scheduler 200, the self-accumulating adder 300 and the adder 400 according to a processed result of the layer processing modules so as to determine a schedule or stop an operation of the scheduler 200, the self-accumulating adder 300 and the adder 400. In another embodiment, the artificial neural network accelerator 110 includes a first layer processing module and a second layer processing module. The first layer processing module has a first layer output end. The second layer processing module has a second layer input end. The fast vector multiplication and accumulation circuit 100 is disposed between the first layer output end of the first layer processing module and the second layer input end of the second layer processing module to process an output signal of the first layer processing module. In addition, the fast vector multiplication and accumulation circuit 100 may be implemented as an application specific integrated circuit (ASIC) on a semiconductor process, and the semiconductor process includes a complementary metal-oxide-semiconductor (CMOS) process or a silicon on insulator (SOI) process. The fast vector multiplication and accumulation circuit 100 may be implemented as a field programmable gate array (FPGA). Therefore, the fast vector multiplication and accumulation circuit 100 of the present disclosure is suitable for use in the artificial neural network accelerator 110 and utilizes the self-accumulating adder 300 combined with application-specific integrated circuits (ASIC) to accomplish a fast inner product operation, thereby greatly reducing the computational complexity, latency and power consumption.

Figure 3A:
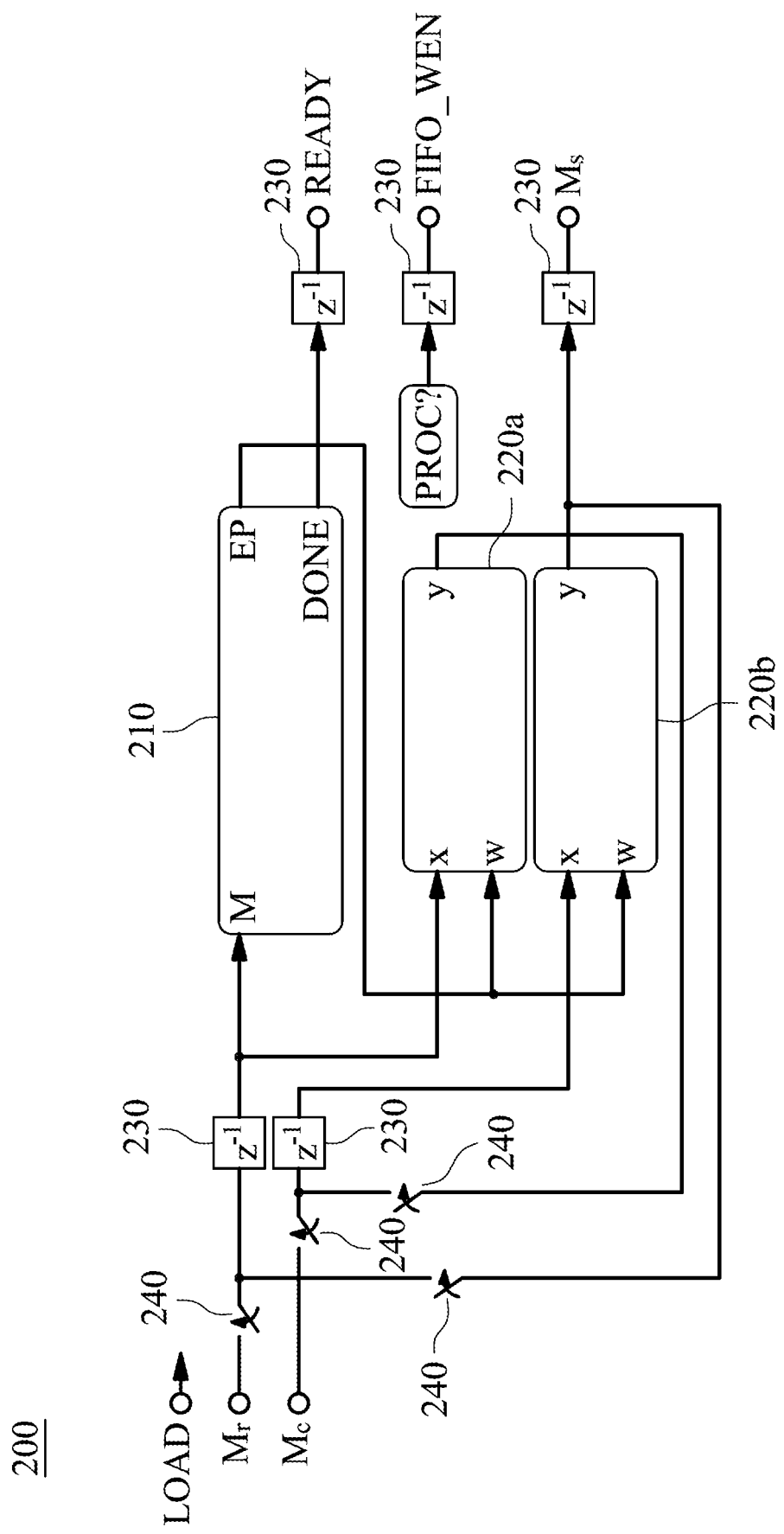
FIG. 3A shows a circuit block diagram of a scheduler of FIG. 2.
Figure 3B:
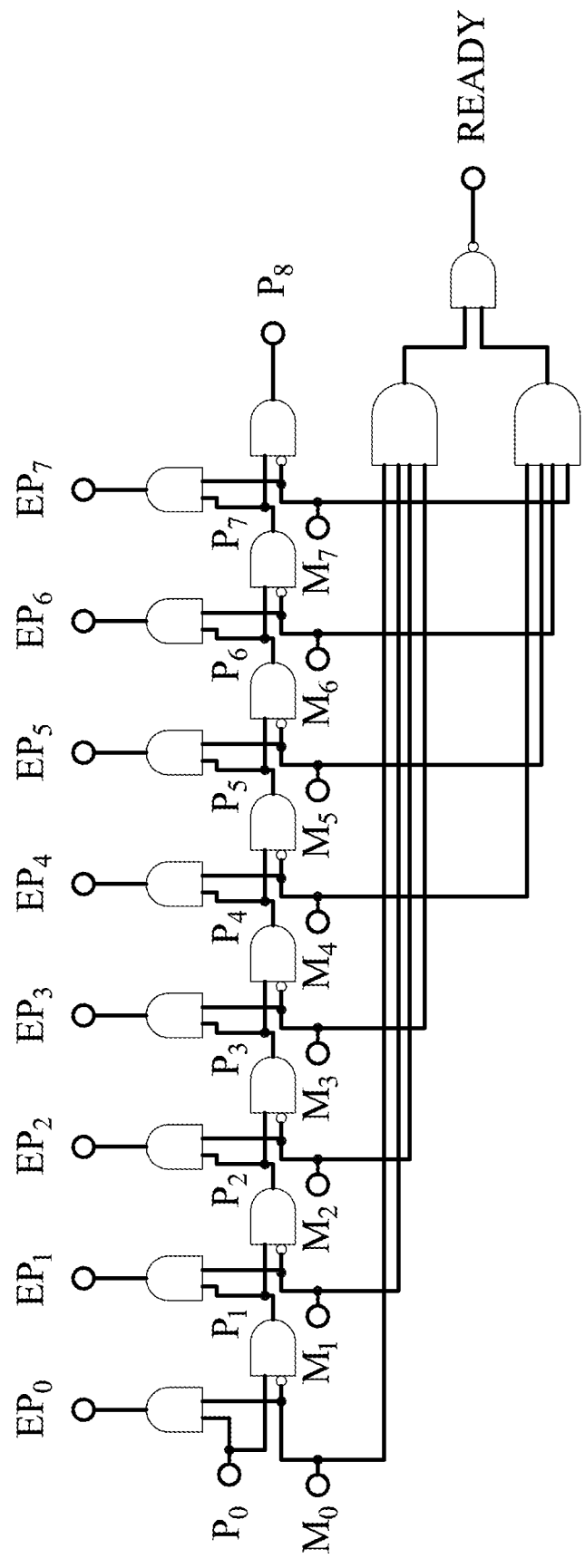
FIG. 3B shows a circuit block diagram of a priority encoder of FIG. 3A.
Figure 3C:
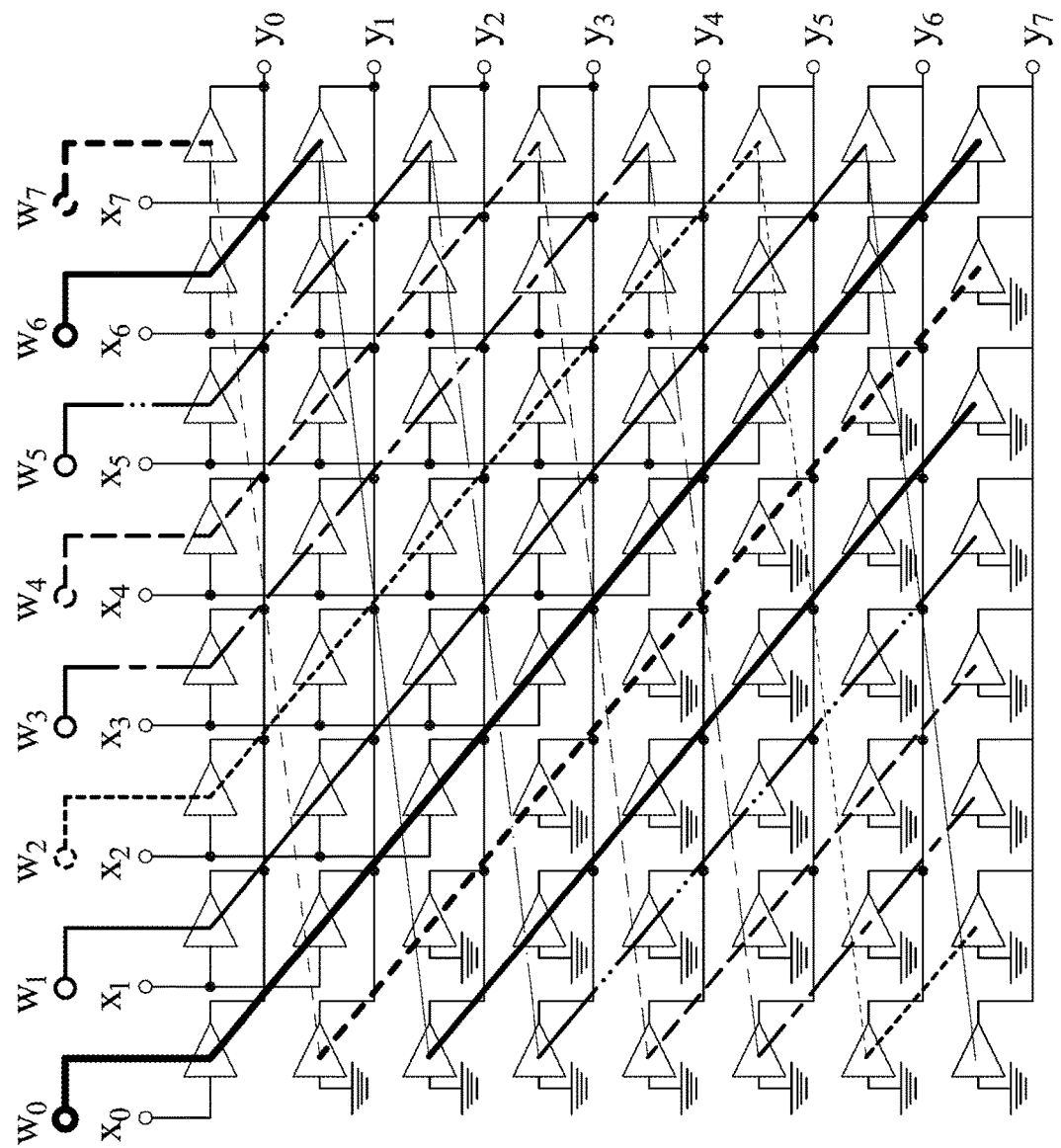
FIG. 3C shows a circuit block diagram of a barrel shifter of FIG. 3A.

FIG. 3A shows a circuit block diagram of a scheduler 200 of FIG. 2; FIG. 3B shows a circuit block diagram of a priority encoder 210 of FIG. 3A; FIG. 3C shows a circuit block diagram of a barrel shifter 220a of FIG. 3A; and FIG. 3D shows pipeline timing diagrams of the scheduler 200 of FIG. 3A. In FIGS. 2, 3A, 3B, 3C and 3D, the scheduler 200 includes a priority encoder 210, two barrel shifters 220a, 220b, five delay elements 230 and four switch elements 240.

The priority encoder 210 sequentially receives the multipliers of the multiplier vector $M_r$. The priority encoder 210 determines at least one valid bit position of each of the multipliers. In other words, the priority encoder 210 determines a position of a value of each of the multipliers, and the value of each of the multipliers is equal to 1. The priority encoder 210 includes eight priority encoding input ports $M_0$, $M_1$, $M_2$, $M_3$, $M_4$, $M_5$, $M_6$, $M_7$, nine priority controlling signals $P_0$, $P_1$, $P_2$, $P_3$, $P_4$, $P_5$, $P_6$, $P_7$, $P_8$, eight priority encoding output ports $EP_0$, $EP_1$, $EP_2$, $EP_3$, $EP_4$, $EP_5$, $EP_6$, $EP_6$, $EP_7$ and a signal READY. The eight priority encoding input ports $M_0$-$M_7$ receive the multipliers of the multiplier vector $M_r$. The nine priority controlling signals $P_0$-$P_8$ are inner signals of the priority encoder 210 and represent a priority status. The priority controlling signal $P_0$ is equal to 1 (i.e., a logical "true" value). When one of the nine priority controlling signals $P_n$ is 0, the subsequent priority controlling signals $P_{n+1}$-$P_8$ cannot obtain the priority state. The priority encoder 210 includes nineteen AND gates and nine inverters, as shown in FIG. 3B. The eight priority encoding output ports $EP_0$-$EP_7$ of the priority encoder 210 generated by the serial connection of the nineteen AND gates and the nine inverters can determine the position of the value of each of the multipliers, and the value of each of the multipliers is equal to 1. For example, if the multiplier of the multiplier vector $M_r$ is 7 ($00000111_{bin}$), the eight priority encoding input ports $M_0$, $M_1$, $M_2$, $M_3$, $M_4$, $M_5$, $M_6$, $M_7$ are 1, 1, 1, 0, 0, 0, 0, 0, respectively. Then, the eight priority encoding output ports $EP_0$, $EP_1$, $EP_2$, $EP_3$, $EP_4$, $EP_5$, $EP_6$, $EP_7$ are 1, 0, 0, 0, 0, 0, 0, 0, respectively. In other words, if the multiplier of the multiplier vector $M_r$ is not equal to zero, the eight priority encoding output ports $EP_0$-$EP_7$ are 1, 0, 0, 0, 0, 0, 0, 0, respectively. On the contrary, if the multiplier of the multiplier vector $M_r$ is equal to zero, the eight priority encoding output ports $EP_0$-$EP_7$ are all zero.

The structure of the barrel shifter 220a is the same as the structure of the barrel shifter 220b. The barrel shifter 220a includes a plurality of tri-state buffers, eight barrel shifting input ports $x_0$, $x_1$, $x_2$, $x_3$, $x_4$, $x_5$, $x_6$, $x_7$, eight barrel shifting output ports $y_0$, $y_1$, $y_2$, $y_3$, $y_4$, $y_5$, $y_6$, $y_7$ and eight barrel shifting control ports $w_0$, $w_1$, $w_2$, $w_3$, $w_4$, $w_5$, $w_6$, $w_7$, as shown in FIG. 3C. The eight barrel shifting control ports $w_0$-$w_7$ are connected to the eight priority encoding output ports $EP_0$-$EP_7$ of FIG. 3B, respectively. The barrel shifter 220a sequentially receives the multiplier of the multiplier vector $M_r$ and is signally connected to the priority encoder 210. The barrel shifter 220a is configured to shift the multiplier of the multiplier vector $M_r$ according to the valid bit position. The barrel shifter 220b sequentially receives the multiplicands $M_c$[0], $M_c$[1], $M_c$[2] of the multiplicand vector $M_c$. The barrel shifter 220b is signally connected to the priority encoder 210, and the barrel shifter 220b is configured to shift the multiplicands $M_c$[0], $M_c$[1], $M_c$[2] to arrange the multiplicands $M_c$[0], $M_c$[1], $M_c$[2] into the scheduled operands $M_s$ according to the valid bit position. In addition, the multiplier vector $M_r$ and the multiplicand vector $M_c$ are shifted a plurality of times according to a priority encoding result of the multiplier vector $M_r$. Each shift operation is determined by the switch elements 240. The scheduled operands $M_s$ may be outputted after each shift operation is carried out. In FIG. 3A, a signal LOAD can control the scheduler 200 and represent that a new multiplier vector $M_r$ and a new multiplicand vector $M_c$ are loaded into the scheduler 200. The scheduler 200 may generate signals READY, PROC, FIFO_WEN to correctly arrange the scheduled operands $M_s$ and outputs the scheduled operands $M_s$ to the self-accumulating adder 300. The signal READY represents the completion of all shift operations. The signal PROC represents the shift operation. The signal FIFO_WEN represents that shift operation is carried out one time, and a set of the scheduled operand $M_s$ is written into input ports of a next level.

The five delay elements 230 and the four switch elements 240 are controlled by the controlling processor 500. The controlling processor 500 can generate control signals to allow the input ports and output ports of the priority encoder 210 and the barrel shifter 220a, 220b to correctly correspond to each other in time, thereby improving the efficiency of the pipeline. The delay elements 230 are configured to delay signals. The switch elements 240 are configured to determine to load a new multiplier vector $M_r$ and a new multiplicand vector $M_c$ into the scheduler 200 or to use a feedback path in the scheduler 200 to shift output signals of the barrel shifter 220a, 220b. In FIG. 3D, when one of the multiplicands of the multiplicand vector $M_c$ and one of the multipliers of the multiplier vector $M_r$ are inputted into the scheduler 200 in a first cycle (e.g., cycle=1), output signals of the priority encoding output ports $EP_0$-$EP_7$ of the priority encoder 210, output signals of the barrel shifting output ports $y_0$-$y_7$ of the barrel shifter 220a, 220b and the scheduled operand $M_s$ are generated in a second cycle (e.g., cycle=2). "L" of the signal $LC_0^{(0)}$ represents "Load". "C" of the signal $CE_0^{(1)}$ represents "Compute". "W" of the signal $WC_0^{(1)}$ represents "Write".

Figure 4A:
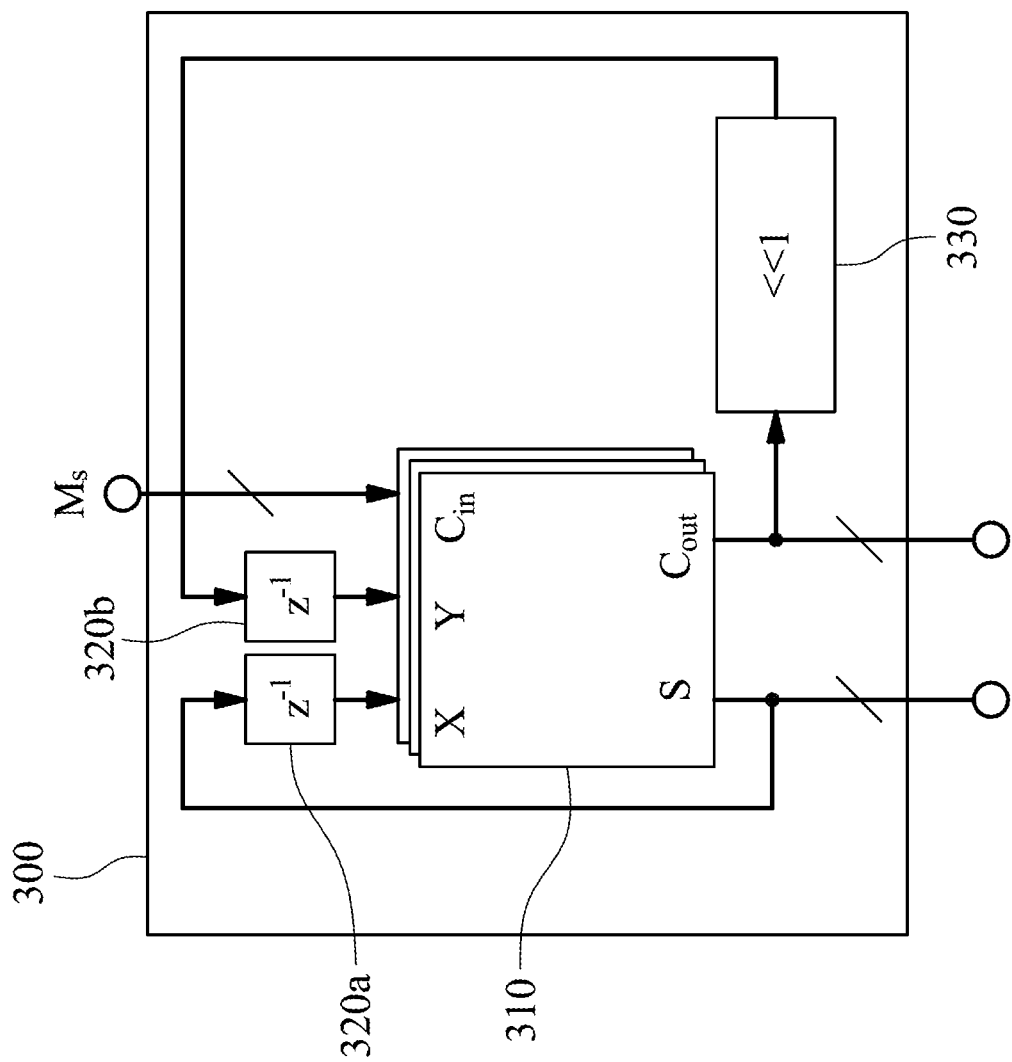
FIG. 4A shows a circuit block diagram of a self-accumulating adder according to one example of FIG. 2.

FIG. 4A shows a circuit block diagram of a self-accumulating adder 300 according to one example of FIG. 2; and FIG. 4B shows pipeline timing diagrams of the self-accumulating adder 300 of FIG. 4A. The self-accumulating adder 300 includes a compressor 310, at least two delay elements 320a, 320b and at least one shifter 330. The compressor 310 has a plurality of input ports X, Y, $C_{in}$ and a plurality of output ports S, $C_{out}$. One of the input ports $C_{in}$ sequentially receives the scheduled operands $M_s$. The compressor 310 is configured to add the scheduled operands $M_s$ to generate a plurality of compressed operands S[n], $C_{out}$[n], and the compressed operands S[n], $C_{out}$[n] are transmitted via the output ports S, $C_{out}$. The two delay elements 320a, 320b are connected to other two of the input ports X, Y of the compressor 310, respectively. One of the two delay elements 320a is connected to one of the output ports S. The shifter 330 is connected between another one of the output ports $C_{out}$ and the other one of the two delay elements 320b. The shifter 330 is configured to shift one of the compressed operands $C_{out}$[n]. In detail, the compressor 310 is a full adder (FA). The full adder has a first input port X, a second input port Y, a third input port $C_{in}$, a first output port S and a second output port $C_{out}$. The full adder is a 3 to 2 compressor. A truth table of the full adder is shown in Table 2. One of the two delay elements 320a is disposed between the first input port X and the first output port S. The other one of the two delay elements 320b and the shifter 330 are disposed between the second input port Y and the second output port $C_{out}$, and the third input port $C_{in}$ is signally connected to the scheduler 200. In FIG. 4B, after n+5 cycles, the first output port S and the second output port $C_{out}$ can correctly output the compressed operands S[n], $C_{out}$[n] which are utilized by a subsequent circuit, such as the adder 400. The compressed operands S[n+5], $C_{out}$[n+5] are corresponding to the signals $C\sigma_1^{(n+3)}$, $C\gamma_1^{(n+3)}$, respectively. An input register and an output FIFO are coupled to an input end and an output end of the self-accumulating adder 300, respectively. The input register and the output FIFO are controlled by the controlling processor 500.

TABLE 2

| X | Y | $C_{in}$ | S | $C_{out}$ |
|---|---|---|---|---|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 0 | 1 | 0 | 1 |
| 1 | 1 | 0 | 0 | 1 |
| 1 | 1 | 1 | 1 | 1 |

Figure 5:
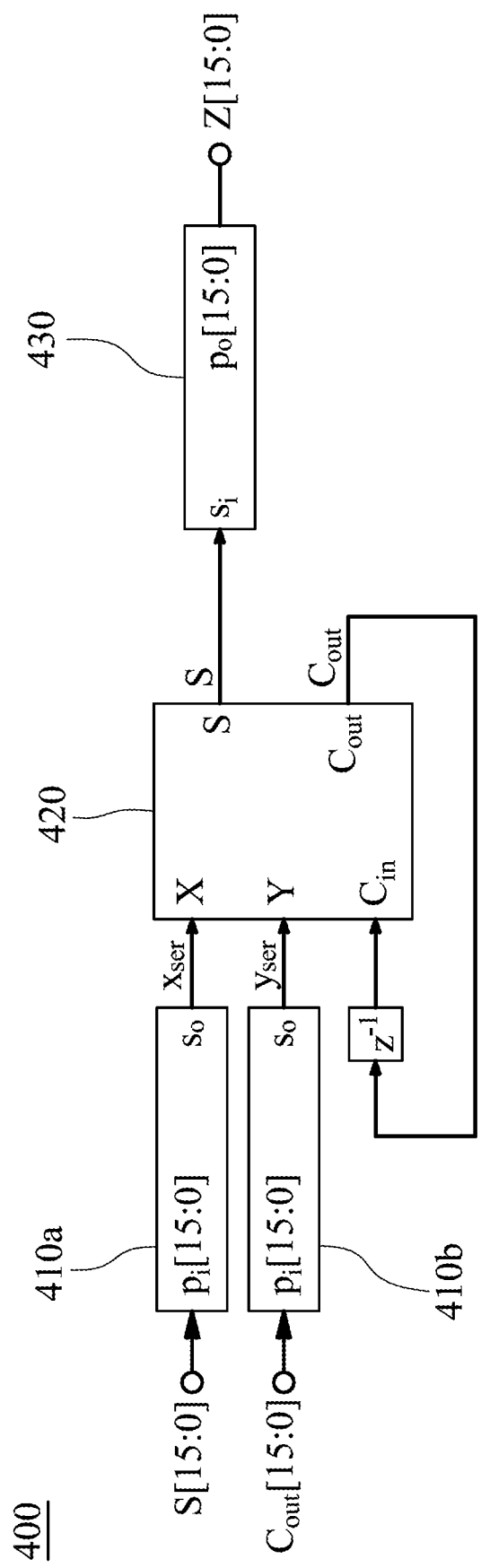
FIG. 5 shows a circuit block diagram of an adder according to one example of FIG. 2.
Figure 6:
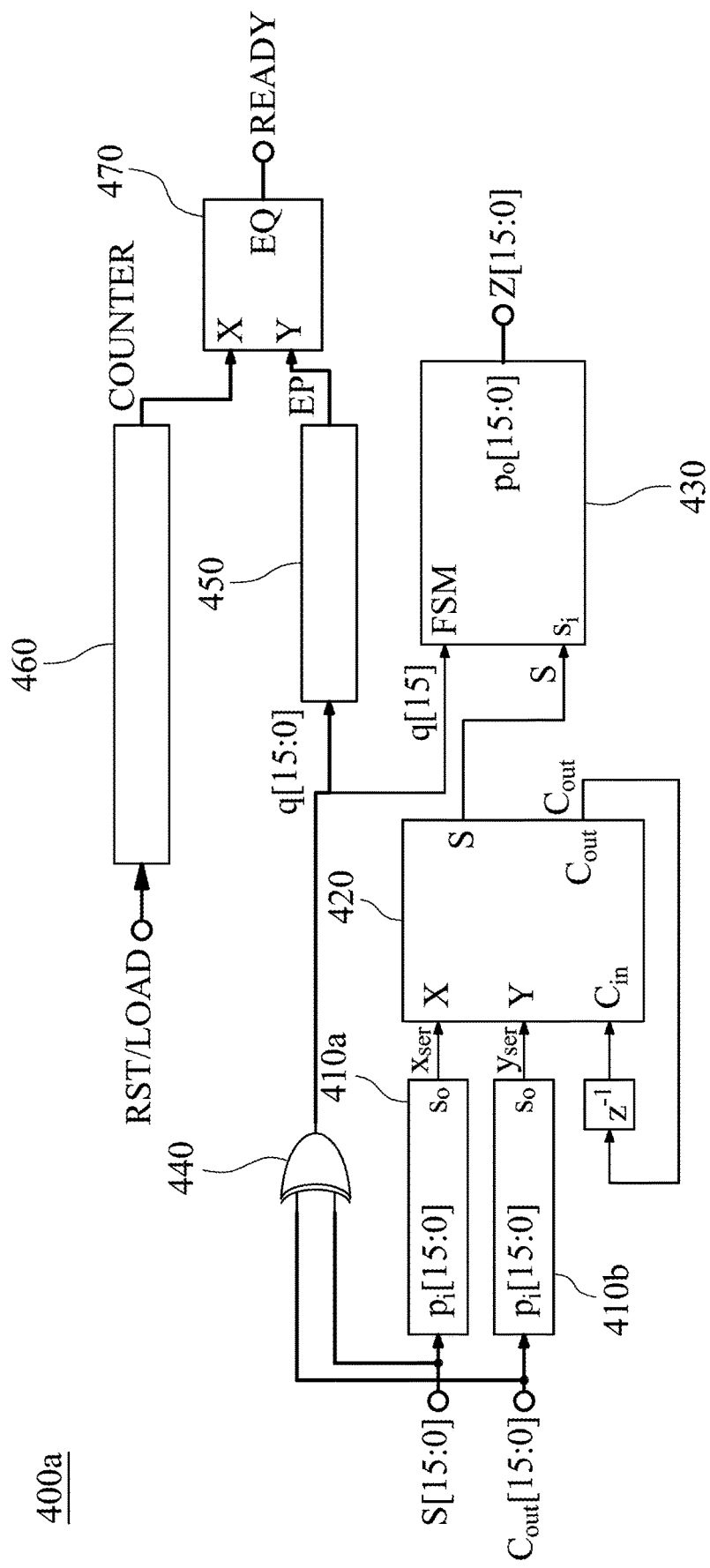
FIG. 6 shows a circuit block diagram of an adder according to another example of FIG. 2.

FIG. 5 shows a circuit block diagram of an adder 400 according to one example of FIG. 2; FIG. 6 shows a circuit block diagram of an adder 400a according to another example of FIG. 2; and FIG. 7 shows pipeline timing diagrams of the adder 400a of FIG. 6. In FIG. 5, the adder 400 includes two parallel-in serial-out (PISO) modules 410a, 410b, a full adder 420 and a serial-In parallel-out (PISO) module 430. The full adder 420 is connected between the two parallel-in serial-out modules 410a, 410b and the serial-In parallel-out module 430. In FIG. 6, the adder 400a includes two parallel-in serial-out modules 410a, 410b, a full adder 420, a serial-In parallel-out module 430, an exclusive OR (XOR) gate 440, a priority encoder 450, a counter 460 and a comparator 470. The exclusive OR gate 440 is coupled to the first output port S and the second output port $C_{out}$ of the self-accumulating adder 300. The exclusive OR gate 440 is connected to the priority encoder 450 and the serial-In parallel-out module 430. The exclusive OR gate 440 transmits an output signal to the priority encoder 450 and the serial-In parallel-out module 430. The priority encoder 450 and the counter 460 are connected to the comparator 470. In the comparator 470, when a value of the input port X is equal to a value of the input port Y, a value of the output port EQ is equal to 1. On the contrary, when the value of the input port X is different from the value of the input port Y, the value of the output port EQ is equal to 0. The exclusive OR gate 440, the priority encoder 450, the counter 460 and the comparator 470 are utilized to generate a signal READY to determine a most valid bit of a signal q[15:0] according to the compressed operands S[15:0], $C_{out}$[15:0]. The signal q[15:0] has sixteen bits. If the signal READY is equal to 0, it represents that the most valid bit of the signal q[15:0] has not yet been found. If the signal READY is equal to 1, it represents that the most valid bit of the signal q[15:0] has been found and may be utilized to early stop the adder 400, thereby greatly reducing the computation and power consumption. For example, if the signal q[15:0] is equal to "0000000011111111", the signal q[7] is the most valid bit, and the compressed operands S[15:8], $C_{out}$[15:8] are all zero. The adder 400 does not need to further process the addition of the compressed operands S[15:8], $C_{out}$[15:8]. In FIG. 7, after n+5 cycles, the serial-In parallel-out module 430 can correctly output the inner product Z which is utilized by a subsequent circuit, such as an activation unit 600. In FIG. 7, the signal RST represents "Reset". Accordingly, each of the adders 400, 400a of the present disclosure utilizes a specific signal judgement circuit to greatly reduce the computation and power consumption.

Figure 8:
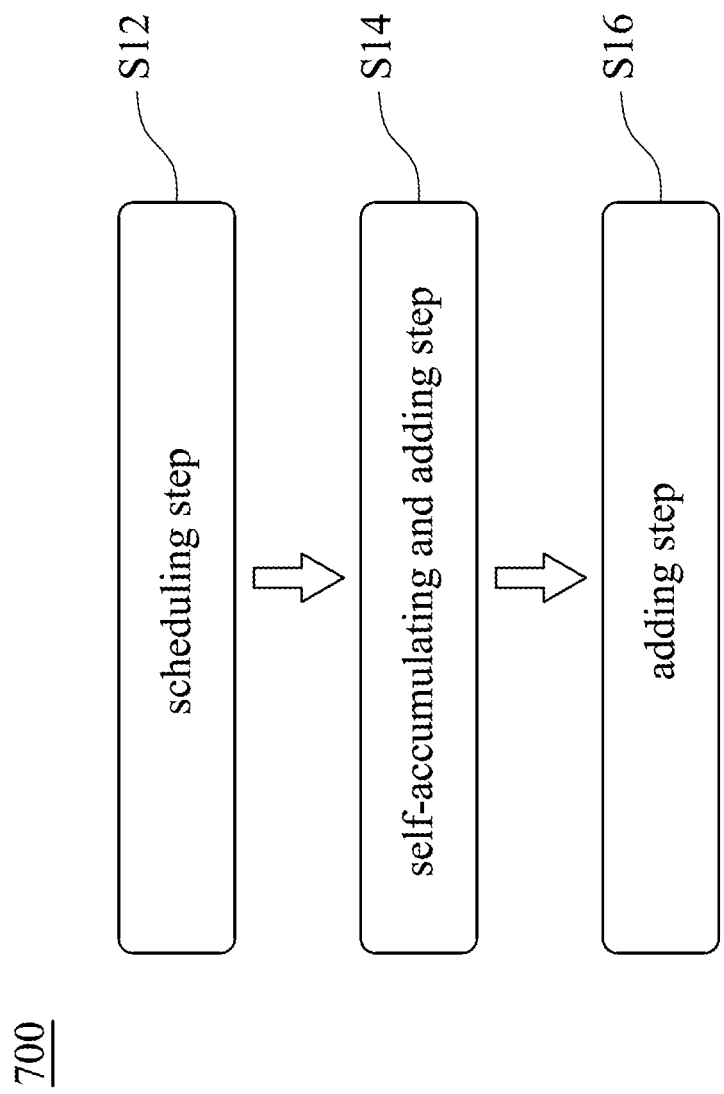
FIG. 8 shows a flow chart of a fast vector multiplication and accumulation method according to one embodiment of the present disclosure.

FIG. 8 shows a flow chart of a fast vector multiplication and accumulation method 700 according to one embodiment of the present disclosure. The fast vector multiplication and accumulation method 700 may be used in the fast vector multiplication and accumulation circuit 100 of FIG. 2. The fast vector multiplication and accumulation method 700 provides a scheduling step S12, a self-accumulating and adding step S14 and an adding step S16. The scheduling step S12 is for driving a scheduler 200 to arrange a plurality of multiplicands of the multiplicand vector $M_c$ into a plurality of scheduled operands $M_s$ according to a plurality of multipliers of the multiplier vector $M_r$, respectively. The self-accumulating and adding step S14 is for driving a self-accumulating adder 300 to add the scheduled operands $M_s$ to generate a plurality of compressed operands S[n], $C_{out}$[n]. The adding step S16 is for driving an adder 400 to add the compressed operands S[n], $C_{out}$[n] to generate an inner product Z. Therefore, the fast vector multiplication and accumulation method 700 of the present disclosure is suitable for use in an inner product operation of the artificial neural network and utilizes the scheduling step S12 combined with the self-accumulating and adding step S14 to accomplish a fast inner product operation, thereby greatly reducing the computational complexity, latency and power consumption.

Figure 9:
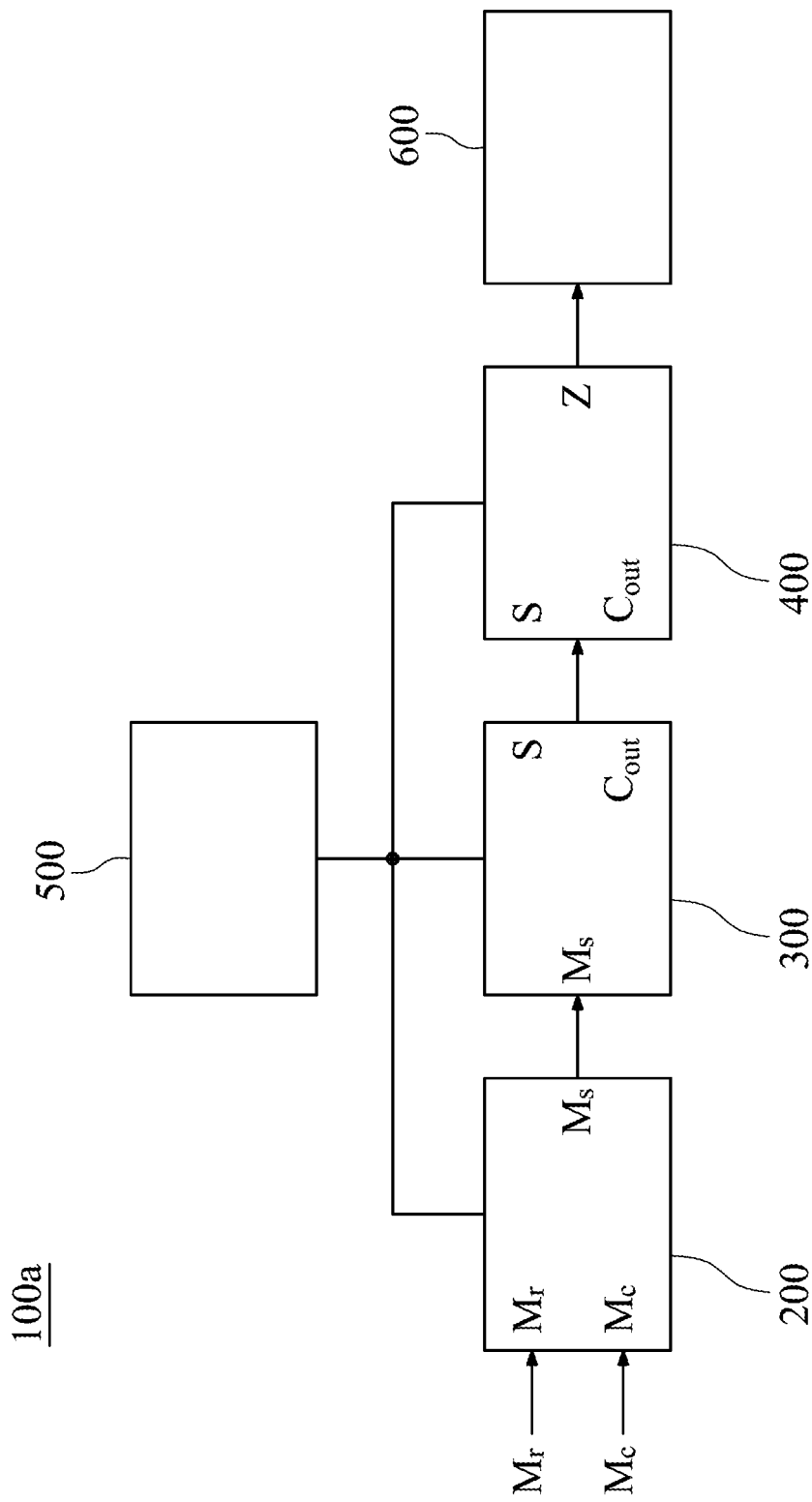
FIG. 9 shows a circuit block diagram of a fast vector multiplication and accumulation circuit according to another example of FIG. 1.

FIG. 9 shows a circuit block diagram of a fast vector multiplication and accumulation circuit 100a according to another example of FIG. 1. The fast vector multiplication and accumulation circuit 100a includes a scheduler 200, a self-accumulating adder 300, an adder 400, a controlling processor 500 and an activation unit 600.

In FIG. 9, the detail of the scheduler 200, the self-accumulating adder 300, the adder 400 and the controlling processor 500 is the same as the example of FIG. 2 and will not be described again herein. In FIG. 9, the fast vector multiplication and accumulation circuit 100a further includes the activation unit 600. The activation unit 600 is signally connected to the adder 400. The activation unit 600 receives the inner product Z and implements a non-linear operation. The non-linear operation includes a sigmoid function, a signum function, a threshold function, a piecewise-linear function, a step function or a tan h function. In addition, the non-linear operation may be implemented as a piecewise quadratic approximation.

Figure 10:
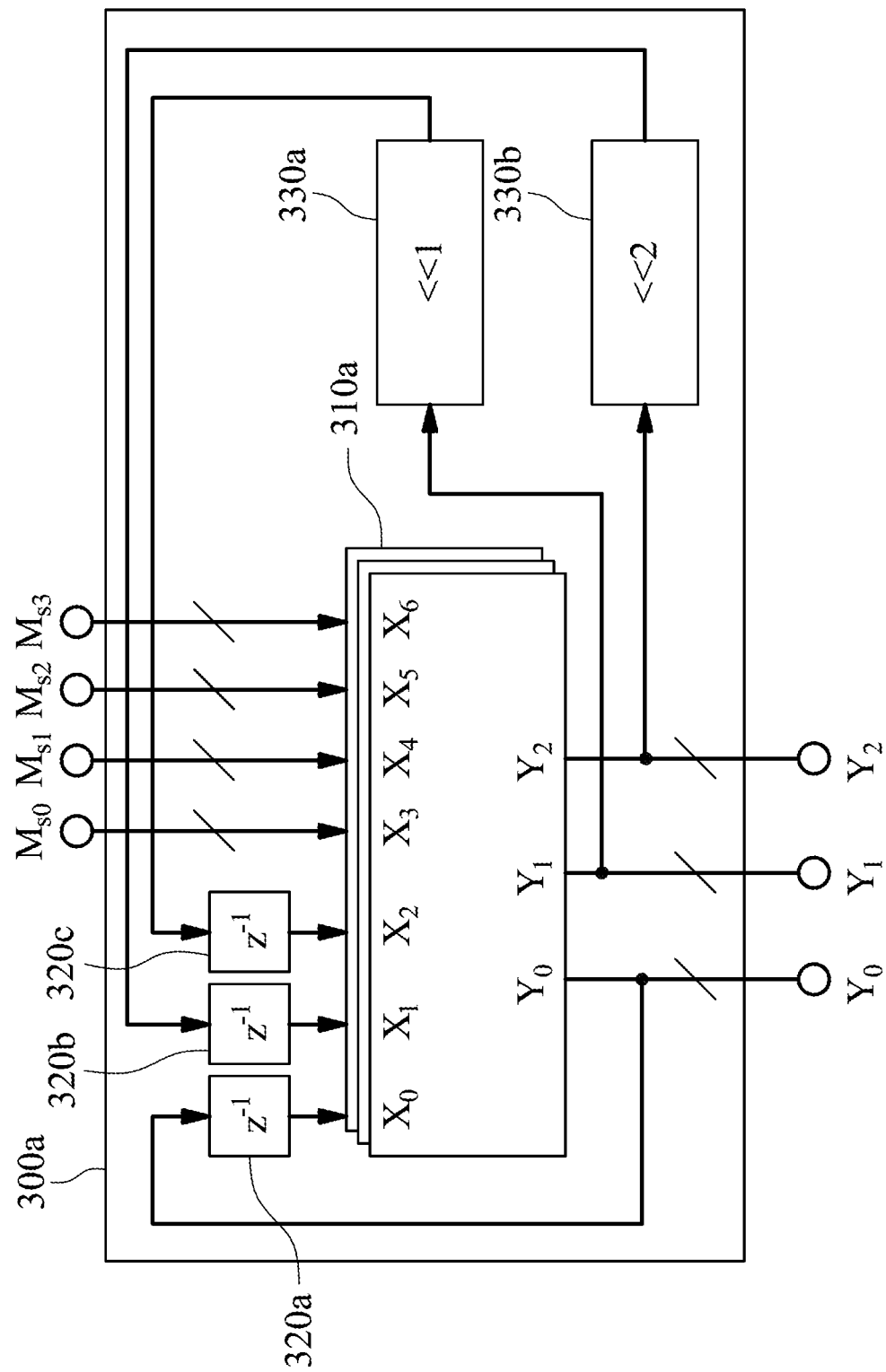
FIG. 10 shows a circuit block diagram of a self-accumulating adder according to another example of FIG. 2.

FIG. 10 shows a circuit block diagram of a self-accumulating adder 300a according to another example of FIG. 2. The self-accumulating adder 300a is configured to process a large number of the multiplier vector $M_r$ and the multiplicand vector $M_c$ at one time. The self-accumulating adder 300a includes a compressor 310a, a first delay element 320a, a second delay element 320b, a third delay element 320c, a first shifter 330a and a second shifter 330b. The compressor 310a is a 7 to 3 compressor having a first input port $X_0$, a second input port $X_1$, a third input port $X_2$, a fourth input port $X_3$, a fifth input port $X_4$, a sixth input port $X_5$, a seventh input port $X_6$, a first output port $Y_0$, a second output port $Y_1$ and a third output port $Y_2$. The first delay element 320a is disposed between the first input port $X_0$ and the first output port $Y_0$. The second delay element 320b and the second shifter 330b are disposed between the second input port $X_1$ and the third output port $Y_2$. The third delay element 320c and the first shifter 330a are disposed between the third input port $X_2$ and the second output port $Y_1$. The fourth input port $X_3$, the fifth input port $X_4$, the sixth input port $X_5$ and the seventh input port $X_6$ are signally connected to the scheduler 200. A truth table of the compressor 310a is shown in Table 3.

TABLE 3

| $X_0$ | $X_1$ | $X_2$ | $X_3$ | $X_4$ | $X_5$ | $X_6$ | $Y_0$ | $Y_1$ | $Y_2$ |
|---|---|---|---|---|---|---|---|---|---|
| 0 | 0 | 0 | 0 | 0 | 0 | 1 | 0 | 0 | 1 |
| 0 | 0 | 0 | 0 | 0 | 1 | 0 | 0 | 0 | 1 |
| 0 | 0 | 0 | 0 | 1 | 0 | 0 | 0 | 0 | 1 |
| ... | | | | | | | | | |
| 0 | 0 | 0 | 0 | 0 | 1 | 1 | 0 | 1 | 0 |
| 0 | 0 | 0 | 0 | 1 | 0 | 1 | 0 | 1 | 0 |
| ... | | | | | | | | | |
| 0 | 0 | 0 | 0 | 1 | 1 | 1 | 0 | 1 | 1 |
| 0 | 0 | 0 | 1 | 1 | 1 | 0 | 0 | 1 | 1 |
| ... | | | | | | | | | |
| 1 | 1 | 1 | 1 | 1 | 1 | 0 | 1 | 1 | 0 |
| 1 | 1 | 1 | 1 | 1 | 0 | 1 | 1 | 1 | 0 |
| ... | | | | | | | | | |
| 1 | 1 | 1 | 1 | 1 | 1 | 1 | 1 | 1 | 1 |

Figure 11:
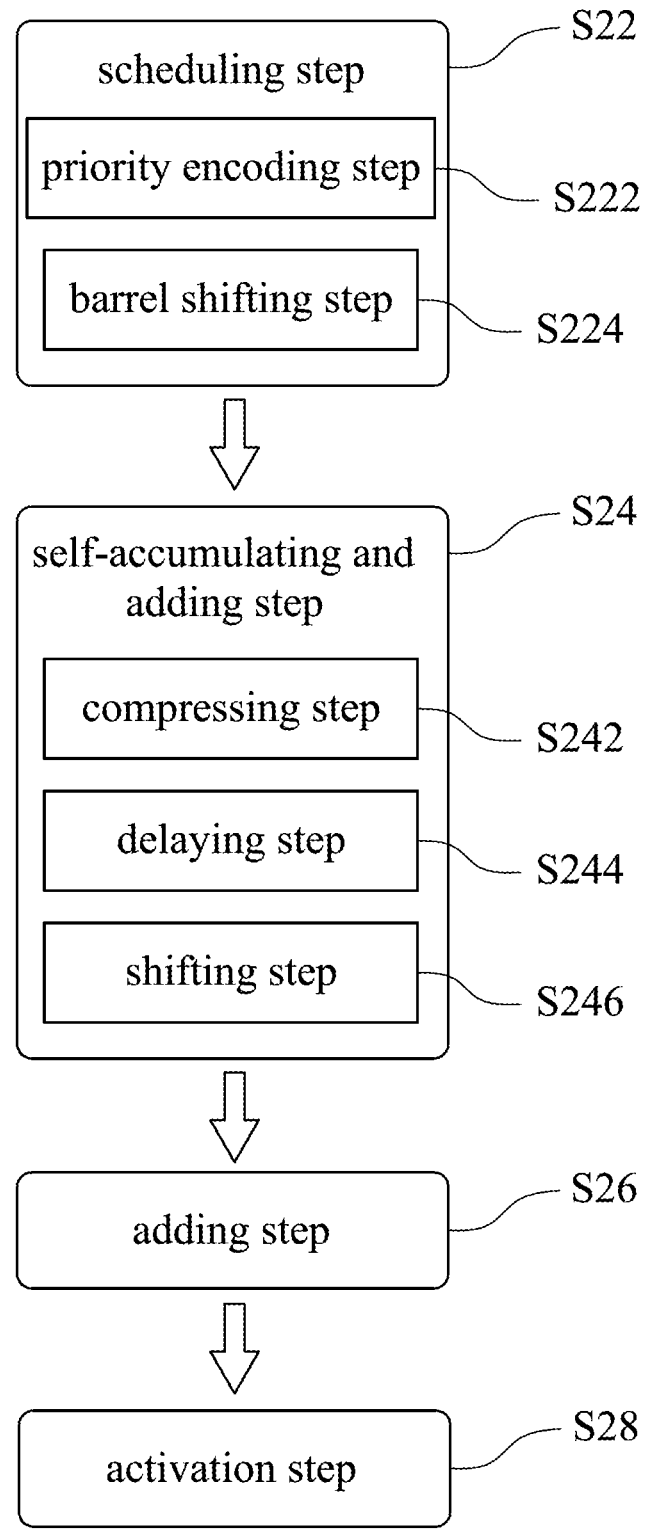
FIG. 11 shows a flow chart of a fast vector multiplication and accumulation method according to another embodiment of the present disclosure.

FIG. 11 shows a flow chart of a fast vector multiplication and accumulation method 700a according to another embodiment of the present disclosure. The fast vector multiplication and accumulation method 700a may be used in the fast vector multiplication and accumulation circuit 100a of FIG. 9. The fast vector multiplication and accumulation method 700a provides a scheduling step S22, a self-accumulating and adding step S24, an adding step S26 and an activation step S28.

The scheduling step S22 is for driving a scheduler 200 to arrange a plurality of multiplicands of the multiplicand vector $M_c$ into a plurality of scheduled operands $M_s$ according to a plurality of multipliers of the multiplier vector $M_r$, respectively. In detail, the scheduling step S22 includes a priority encoding step S222 and a barrel shifting step S224. The priority encoding step S222 is for driving a priority encoder 210 (shown in FIG. 3A) to sequentially receive the multipliers of the multiplier vector $M_r$. The priority encoder 210 determines at least one valid bit position of each of the multipliers. The barrel shifting step S224 is for driving barrel shifters 220a, 220b (shown in FIG. 3A) to sequentially receive the multiplicands of the multiplicand vector $M_c$. The barrel shifters 220a, 220b are signally connected to the priority encoder 210, and the barrel shifters 220a, 220b are configured to shift the multiplicands to arrange the multiplicands into the scheduled operands $M_s$ according to the valid bit position.

The self-accumulating and adding step S24 is for driving a self-accumulating adder 300 (shown in FIG. 4A) to add the scheduled operands $M_s$ to generate a plurality of compressed operands S[n], $C_{out}$[n]. In detail, the self-accumulating and adding step S24 includes a compressing step S242, a delaying step S244 and a shifting step S246. The compressing step S242 is for driving a compressor 310 (shown in FIG. 4A) to add the scheduled operands $M_s$ to generate a plurality of compressed operands S[n], $C_{out}$[n]. The delaying step S244 is for driving two delay elements 320a, 320b (shown in FIG. 4A) to delay the compressed operands S[n], $C_{out}$[n] and then transmit the compressed operands S[n], $C_{out}$[n] to the compressor 310. The shifting step S246 is for driving a shifter 330 (shown in FIG. 4A) to shift the compressed operand $C_{out}$[n] and then transmit the compressed operand $C_{out}$[n] to the delay element 320b. Moreover, the self-accumulating and adding step S24 may be for selecting a 3 to 2 compressor, a 7 to 3 compressor or other types of adder as the compressor 310. The 3 to 2 compressor and the 7 to 3 compressor are shown in FIGS. 4A and 10, respectively.

The adding step S26 is for driving an adder 400 or an adder 400a to add the compressed operands S[n], $C_{out}$[n] to generate an inner product Z. The adder 400 is shown in FIG. 5. The adder 400a is shown in FIG. 6.

The activation step S28 is for driving an activation unit 600 (shown in FIG. 9) to receive the inner product Z and implements a non-linear operation. The non-linear operation includes a sigmoid function, a signum function, a threshold function, a piecewise-linear function, a step function or a tan h function. Therefore, the fast vector multiplication and accumulation method 700a of the present disclosure is suitable for use in an inner product operation of the artificial neural network and utilizes the scheduling step S22 combined with the self-accumulating and adding step S24 to accomplish a fast inner product operation, thereby not only greatly reducing the computational complexity, latency and power consumption, but also reducing the chip area and the cost of production. Table 4 lists the total number of full adders (hardware complexity) used in the present disclosure and a conventional direct MAC circuit. It is obvious that the hardware complexity of the present disclosure is lower than the hardware complexity of the conventional direct MAC circuit.

TABLE 4

| Hardware complexity | Direct MAC | Present disclosure |
|---|---|---|
| # Full adders | 80(64⊗16⊕) | 32(16⊕16⊕) |
| # FA time/matrix OP (Worst case) | | N × N |
| # FA time/matrix OP (Equal 0/1) | | N × N/2 |

According to the aforementioned embodiments and examples, the advantages of the present disclosure are described as follows.

1. The fast vector multiplication and accumulation circuit and the fast vector multiplication and accumulation method of the present disclosure utilize the self-accumulating adder combined with application-specific integrated circuits (ASIC) to accomplish a fast inner product operation, thereby greatly reducing the computational complexity, latency and power consumption. In addition, the fast vector multiplication and accumulation circuit and the fast vector multiplication and accumulation method of the present disclosure utilize a multi-bit compressor of the self-accumulating adder and a binary arithmetic coding of the scheduler to greatly enhance a level of vector parallelism of a long vector inner product operation.

2. The fast vector multiplication and accumulation circuit and the fast vector multiplication and accumulation method of the present disclosure are suitable for use in an inner product operation of the artificial neural network.

3. The fast vector multiplication and accumulation circuit and the fast vector multiplication and accumulation method of the present disclosure utilize the scheduling step combined with the self-accumulating and adding step to accomplish a fast inner product operation, thereby not only greatly reducing the computational complexity, latency and power consumption, but also reducing the chip area and the cost of production.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fast vector multiplication and accumulation circuit, which is applied to an artificial neural network accelerator and configured to calculate an inner product of a multiplier vector and a multiplicand vector, the fast vector multiplication and accumulation circuit comprising:
   a scheduler configured to arrange a plurality of multiplicands of the multiplicand vector into a plurality of scheduled operands according to a plurality of multipliers of the multiplier vector, respectively;
   a self-accumulating adder signally connected to the scheduler and comprising:
      a compressor having a plurality of input ports and a plurality of output ports, wherein one of the input ports sequentially receives the scheduled operands, the compressor is configured to add the scheduled operands to generate a plurality of compressed operands, and the compressed operands are transmitted via the output ports;
      at least two delay elements connected to other two of the input ports of the compressor, respectively, wherein one of the at least two delay elements is connected to one of the output ports; and
      at least one shifter connected between another one of the output ports and another one of the at least two delay elements, wherein the at least one shifter is configured to shift one of the compressed operands; and
   an adder signally connected to the output ports of the compressor so as to add the compressed operands to generate the inner product.

2. The fast vector multiplication and accumulation circuit of claim 1, further comprising:
   an activation unit signally connected to the adder, wherein the activation unit receives the inner product and implements a non-linear operation.

3. The fast vector multiplication and accumulation circuit of claim 2, wherein the non-linear operation comprises a sigmoid function, a signum function, a threshold function, a piecewise-linear function, a step function or a tanh function.

4. The fast vector multiplication and accumulation circuit of claim 2, wherein the non-linear operation is implemented as a piecewise quadratic approximation.

5. The fast vector multiplication and accumulation circuit of claim 1, wherein the compressor is a full adder, the full adder has a first input port, a second input port, a third input port, a first output port and a second output port, one of the at least two delay elements is disposed between the first input port and the first output port, the other one of the at least two delay elements is disposed between the second input port and the second output port, and the third input port is signally connected to the scheduler.

6. The fast vector multiplication and accumulation circuit of claim 1, wherein the compressor is a 7-to-3 compressor, the 7-to-3 compressor has a first input port, a second input port, a third input port, a fourth input port, a fifth input port, a sixth input port, a seventh input port, a first output port, a second output port and a third output port, the at least two delay elements comprise a first delay element and a second delay element, the at least one shifter comprises a first shifter and a second shifter, the self-accumulating adder further comprises a third delay element, the first delay element is disposed between the first input port and the first output port, the second delay element and the second shifter are disposed between the second input port and the third output port, the third delay element and the first shifter are disposed between the third input port and the second output port, and the fourth input port, the fifth input port, the sixth input port and the seventh input port are signally connected to the scheduler.

7. The fast vector multiplication and accumulation circuit of claim 1, wherein the adder is implemented as a carry look-ahead adder, a carry propagate adder, a carry save adder or a ripple carry adder.

8. The fast vector multiplication and accumulation circuit of claim 1, further comprising:
   a controlling processor signally connected to the scheduler, the self-accumulating adder and the adder, wherein the controlling processor is configured to control the scheduler, the self-accumulating adder and the adder.

9. The fast vector multiplication and accumulation circuit of claim 1, wherein the scheduler comprises:
   at least one priority encoder sequentially receiving the multipliers of the multiplier vector, wherein the at least one priority encoder determines at least one valid bit position of each of the multipliers; and
   at least one barrel shifter sequentially receiving the multiplicands of the multiplicand vector, wherein the at least one barrel shifter is signally connected to the at least one priority encoder, and the at least one barrel shifter is configured to shift the multiplicands to arrange the multiplicands into the scheduled operands according to the at least one valid bit position.

10. The fast vector multiplication and accumulation circuit of claim 1, wherein the fast vector multiplication and accumulation circuit is implemented as an application specific integrated circuit (ASIC) on a semiconductor process, and the semiconductor process comprises a complementary metal-oxide-semiconductor (CMOS) process or a silicon on insulator (SOI) process.

11. The fast vector multiplication and accumulation circuit of claim 1, wherein the fast vector multiplication and accumulation circuit is implemented as a field programmable gate array (FPGA).

12. A fast vector multiplication and accumulation circuit, which is applied to an artificial neural network accelerator and configured to calculate an inner product of a multiplier vector and a multiplicand vector, the fast vector multiplication and accumulation circuit comprising:
   a scheduler configured to arrange a plurality of multiplicands of the multiplicand vector into a plurality of scheduled operands according to a plurality of multipliers of the multiplier vector, respectively;
   a self-accumulating adder signally connected to the scheduler, wherein the self-accumulating adder is configured to add the scheduled operands to generate a plurality of compressed operands; and
   an adder signally connected to the self-accumulating adder so as to add the compressed operands to generate the inner product.

13. The fast vector multiplication and accumulation circuit of claim 12, wherein the scheduler comprises:
   at least one priority encoder sequentially receiving the multipliers of the multiplier vector, wherein the at least one priority encoder determines at least one valid bit position of each of the multipliers; and
   at least one barrel shifter sequentially receiving the multiplicands of the multiplicand vector, wherein the at least one barrel shifter is signally connected to the at least one priority encoder, and the at least one barrel shifter is configured to shift the multiplicands to arrange the multiplicands into the scheduled operands according to the at least one valid bit position.

14. The fast vector multiplication and accumulation circuit of claim 12, wherein the adder is implemented as a carry look-ahead adder, a carry propagate adder, a carry save adder or a ripple carry adder.

15. The fast vector multiplication and accumulation circuit of claim 12, wherein the self-accumulating adder comprises:
   a compressor having a plurality of input ports and a plurality of output ports, wherein one of the input ports sequentially receives the scheduled operands, the compressor is configured to add the scheduled operands to generate the compressed operands, and the compressed operands are transmitted via the output ports; and
   at least two delay elements connected to other two of the input ports of the compressor, respectively, wherein one of the at least two delay elements is connected to one of the output ports.

16. The fast vector multiplication and accumulation circuit of claim 15, wherein the compressor is a full adder, the full adder has a first input port, a second input port, a third input port, a first output port and a second output port, one of the at least two delay elements is disposed between the first input port and the first output port, the other one of the at least two delay elements is disposed between the second input port and the second output port, and the third input port is signally connected to the scheduler.

17. The fast vector multiplication and accumulation circuit of claim 15, wherein the compressor is a 7-to-3 compressor, the 7-to-3 compressor has a first input port, a second input port, a third input port, a fourth input port, a fifth input port, a sixth input port, a seventh input port, a first output port, a second output port and a third output port, the at least two delay elements comprise a first delay element, a second delay element and a third delay element, the first delay element is disposed between the first input port and the first output port, the second delay element is disposed between the second input port and the third output port, the third delay element is disposed between the third input port and the second output port, and the fourth input port, the fifth input port, the sixth input port and the seventh input port are signally connected to the scheduler.

18. The fast vector multiplication and accumulation circuit of claim 12, wherein the fast vector multiplication and accumulation circuit is implemented as an application specific integrated circuit (ASIC) on a semiconductor process, and the semiconductor process comprises a complementary metal-oxide-semiconductor (CMOS) process or a silicon on insulator (SOI) process.

19. The fast vector multiplication and accumulation circuit of claim 12, wherein the fast vector multiplication and accumulation circuit is implemented as a field programmable gate array (FPGA).

* * * * *